July 26, 1949.  E. H. SCHMIDT  2,477,010
SPOOL
Filed Dec. 21, 1946
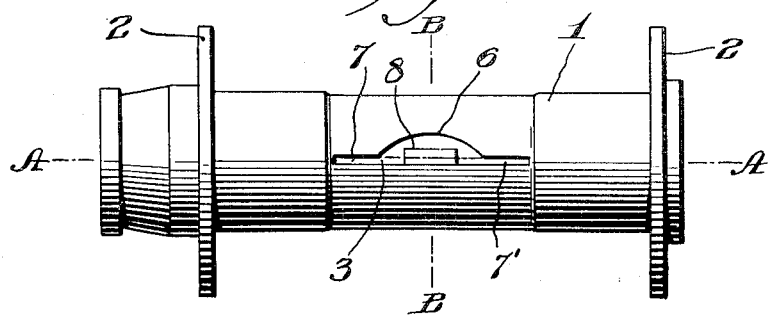
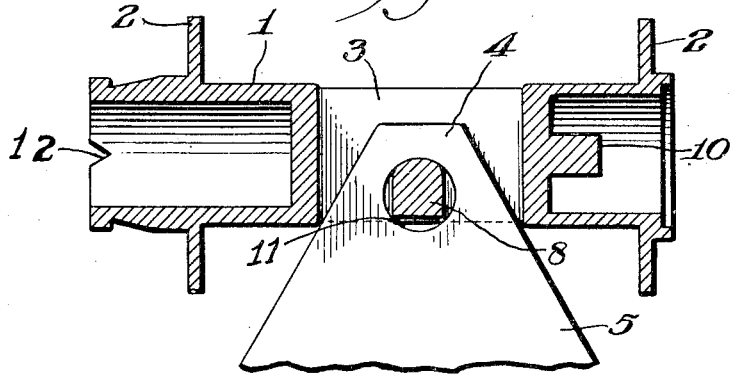
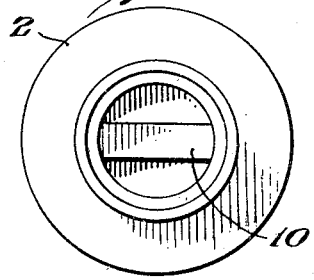
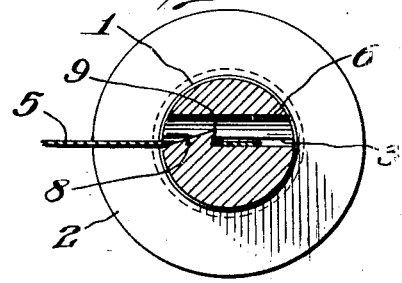
INVENTOR.
Edgar H. Schmidt
BY
Lynn Barratt Morris
ATTORNEY Patented July 26, 1949

2,477,010

UNITED STATES PATENT OFFICE 2,477,010

SPOOL

Edgar H. Schmidt, Wilmington, Del., assignor to E. I. du Pont de Nemours & Company, Wilmington, Del., a corporation of Delaware Application December 21, 1946, Serial No. 717,641

5 Claims. (Cl. 242—74)

This invention relates to a spool for flexible sheet material. More particularly, it relates to a spool for flexible film material. Still more particularly it relates to a spool for photographic film which is provided with means for fastly connecting the film element to the spool.

An object of this invention is to provide a film spool to which a film element can be readily connected. A further object is to provide such a spool to which a film element can be fastly connected. A still further object is to provide such a spool for cartridges and cameras which will prevent the film from being disengaged from the spool after the last convolution has been unwound therefrom. Still other objects will be apparent from the following description and the accompanying drawing which forms a part of the specification.

Reference will now be made to the accompanying drawing in which the same reference characters refer to the same parts throughout the several figures.

Fig. 1 is an elevation view of the spool;

Fig. 2 is a cross-sectional view taken along the lines A—A of Fig. 1 showing a film end in plan view;

Fig. 3 is an elevation of the right end of the spool; and

Fig. 4 is a cross-sectional view taken along the lines B—B of Fig. 1.

The novel film spools consist of a hub member 1 which is provided with flanges 2, between which flexible film is adapted to be wound, and an elongated slot 3 into which the end 4 of a film strip 5 may be entered. The slot 3 is provided with an arcuate upper portion 6 in the center of the slot and rectangular outer portions 7 and 7'. Immediately below the arcuate portion of the slot is disposed a hook-like projection 8. The outer end of the projection is approximately flush with the bottom of the slot but tapers upwardly from the periphery of the hub. The upper end 9 of the hook extends into the arcuate portion of the slot and beyond the upper surface of the rectangular portions 7 and 7'. A hole 11 in the film element 5 fits over the hook.

A roll of film may be placed on the spool by merely inserting the end of the film into the slot. The film flexes upon being pushed into the slot and after the edges of the opening pass the edge of the hook the film snaps into a flat or unflexed position. The film element cannot be removed once it has been flexed over the hook by pulling it from any position because the narrow cross-sectional portions 7 and 7' of the slot prevent any flexing of the film. This is decidedly advantageous when the film spool and roll of film are inserted into a film cartridge and placed in a camera because the end of the film cannot be separated from the spool after it has been completely exposed and unwound. The film can be readily rewound onto the spool by turning the hub. This may be accomplished by placing a key over the projection 10 in one end of the hub.

The hub and flanges of the novel spool may be composed of various materials, e. g., metal, wood, plastic, etc. They may be advantageously made of plastic materials by a molding operation. Suitable materials include synthetic resins, superpolymers and cellulose derivatives, e. g., cellulose acetate, ethyl cellulose, cellulose propionate, cellulose acetopropionate, cellulose acetobutyrate, methyl cellulose, benzyl cellulose; nylons, polystyrene, alkyd resins, cresol-formaldehyde resins, etc.

The plastic compositions can, of course, be modified by the incorporation of various plasticizers, e. g., camphor, aryl phosphates, alkyl phthalates, glycerol, castor oil, etc.; pigments, e. g., lithopone, graphite, carbon black, titanium oxide, phthalocyanine dyes, etc.; fillers, e. g., wood flour, diatomaceous earth, etc.

When metals are used, die casting, as well as powdered metal molding operations, may be resorted to. Among useful metals are brass and aluminum.

The spools should be photographically inert so that the film elements spooled thereon will not be deleteriously affected. The spools can be covered with an inert varnish or lacquer to insure against possible deleterious ingredients in the body thereof.

Instead of molding the spool in one piece, two hemicylindrical halves may be made and riveted or adhesively joined together. In such case a separate hook could be screwed into the lower surface and made of metal or plastic.

The essential feature of novelty of the spools of the invention resides in the narrow slot with the arcuate portion and co-operating hook. It is not limited to the particular flanges shown. The latter may be of any design and adapted to fit with various types of cartridges. The flanges may be integral with the hub portion or separate and affixed by various methods or means. Metal flanges may be slipped over the hub and portions upset into the hub. A double flange construction, as shown in Nebel application Serial Number 717,645, filed on even date herewith, is especially advantageous when the hubs of this invention are to be used in the casing of said Nebel application. Similarly, the end portions of the hub may have various shapes and key constructions so that they will be useful in various types of cameras. The slot 12, shown in Fig. 2 of the drawing, illustrates one such modification. This slot is used for registration in film winding machines.

While the spools of this invention were expressly designed for photographic film rolls, they may find utility for other sheet materials, e. g., paper, cloth, unsensitized films, etc. They are also useful when it is desired to have the end of the sheet material or strip remain attached to the spool after it has been completely unwound.

An advantage of the spools of this invention is that they are simple in construction. A further advantage is that they are easy to use in spooling operations. A still further advantage resides in the fact that the film end may be readily engaged but is not readily disengageable.

As many widely different embodiments of this invention can be made without departing from the spirit and scope thereof, it is to be understood that the invention is not to be limited except as defined by the claims.

What is claimed is:

1. A film spool comprising a cylindrical, relatively solid hub member having a diametrically disposed, narrow, rectangular slot extending completely through the hub, said slot having an arcuate shaped portion in one surface which also extends completely through the hub and a hook in its opposing surface which extends into the said arcuate portion.

2. A film spool comprising a cylindrical, relatively solid hub member having a diametrically disposed, narrow, rectangular slot extending completely through the hub, said slot having an arcuate shaped portion in the central part of one surface which also extends completely through the hub and a tapered hook in its opposing surface which extends into the said arcuate portion, the taper beginning at the periphery of the spool extending upwardly into the arcuate portion.

3. A film spool comprising a cylindrical, relatively solid hub member having a diametrically disposed, narrow, rectangular slot extending completely through the hub, said slot having an arcuate shaped portion in the central part of one surface which also extends completely through the hub and a tapered hook in its opposing surface which extends into the said arcuate portion, the taper beginning at the periphery of the spool extending upwardly into the arcuate portion and spaced annular flanges on said hub.

4. A molded spool comprising a cylindrical, relatively solid hub member having a diametrically disposed narrow, rectangular slot extending completely through the hub, said slot having an arcuate shaped portion in one surface which also extends completely through the hub, the chord of said arc being a continuation of said rectangular slot, an integral tapered hook in its opposing surface which extends into the said arcuate portion, and integral spaced annular flanges on said hub.

5. A molded film spool comprising a cylindrical, relatively solid hub member having a diametrically disposed narrow, rectangular slot extending completely through the hub, said slot having an arcuate shaped portion in one surface, an integral tapered hook in its opposing surface which extends into the said arcuate portion, and integral spaced annular flanges on said hub which are adapted to receive a roll of film, said slot and tapered hook co-operating to flex an inserted photographic film and direct an opening in the film to engage the hook and unflex the film.

EDGAR H. SCHMIDT.

REFERENCES CITED

The following references are of record in the file of this patent:

UNITED STATES PATENTS

| Number | Name | Date |
|---|---|---|
| 952,708 | Meahl | Mar. 22, 1910 |
| 1,930,144 | Lee | Oct. 10, 1933 |
| 2,104,746 | Hueber | Jan. 11, 1938 |